(12) United States Patent
Hsieh

(10) Patent No.: US 7,287,173 B2
(45) Date of Patent: Oct. 23, 2007

(54) METHOD FOR COMPUTING POWER CONSUMPTION LEVELS OF INSTRUCTION AND RECOMPILING THE PROGRAM TO REDUCE THE EXCESS POWER CONSUMPTION

(75) Inventor: Cheng-Hsueh Hsieh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 10/741,002

(22) Filed: Dec. 19, 2003

(65) Prior Publication Data

US 2005/0138450 A1 Jun. 23, 2005

(51) Int. Cl.
*G06F 1/26* (2006.01)
(52) U.S. Cl. .............. 713/320; 713/300; 713/322; 713/324
(58) Field of Classification Search ......... 713/300, 713/320, 322, 324
See application file for complete search history.

(56) References Cited

U.S. PATENT DOCUMENTS

| | | | | |
|---|---|---|---|---|
| 5,996,083 A * | 11/1999 | Gupta et al. | ............... | 713/322 |
| 6,219,796 B1 * | 4/2001 | Bartley | ............... | 713/320 |
| 6,256,743 B1 * | 7/2001 | Lin | ............... | 713/322 |
| 6,477,654 B1 * | 11/2002 | Dean et al. | ............... | 713/300 |
| 6,564,328 B1 * | 5/2003 | Grochowski et al. | ............... | 713/320 |
| 6,625,740 B1 * | 9/2003 | Datar et al. | ............... | 713/324 |
| 7,155,617 B2 * | 12/2006 | Gary et al. | ............... | 713/300 |
| 2003/0126476 A1 * | 7/2003 | Greene | ............... | 713/300 |
| 2004/0268159 A1 * | 12/2004 | Aasheim et al. | ............... | 713/300 |

OTHER PUBLICATIONS

IBM Corp., "Method and apparatus for adapting code generated by a dynamic compiler in response to thermal conditions", Research Disclosure 463198.
PCT Int'l Search Report in co-pending Appl'n No. PCT/US2004/040136, mailed Apr. 11, 2005.

* cited by examiner

*Primary Examiner*—Chun Cao
*Assistant Examiner*—Sean Weinman
(74) *Attorney, Agent, or Firm*—Blakely, Sokoloff, Taylor & Zafman LLP

(57) ABSTRACT

In some embodiments, a method and apparatus for power performance monitors for low-power program tuning are described. In one embodiment, the method includes the computation of power consumption levels of instructions of an application. Once consumption levels are computed, instruction sequences of the application are identified that exhibit an excess power consumption level. For the identified instruction sequences, the application program is recompiled to reduce power consumption levels of one or more of the identified instruction sequences. Other embodiments are described and claimed.

30 Claims, 9 Drawing Sheets

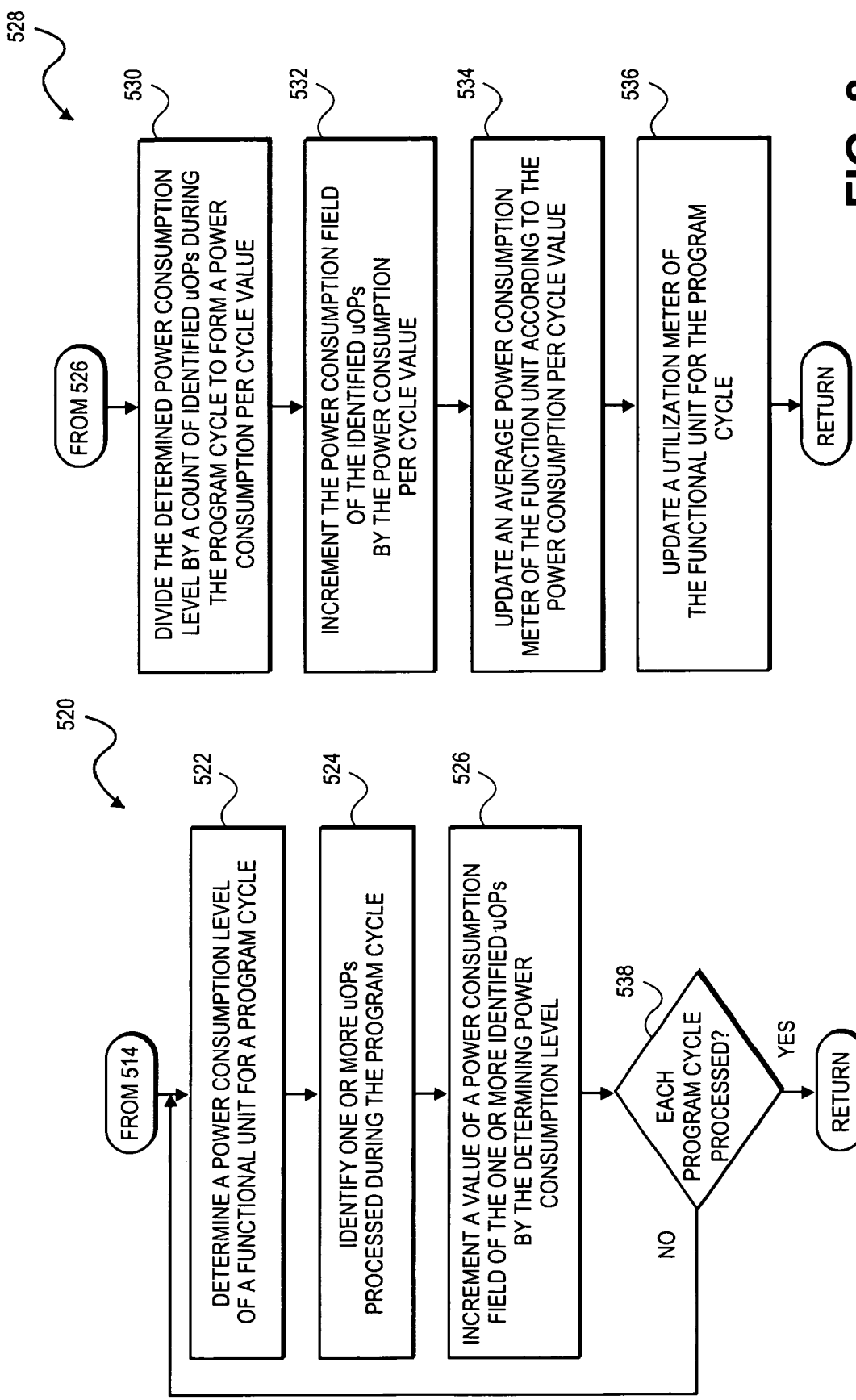

METHOD FOR COMPUTING POWER CONSUMPTION LEVELS OF INSTRUCTION AND RECOMPILING THE PROGRAM TO REDUCE THE EXCESS POWER CONSUMPTION

FIELD OF THE INVENTION

One or more embodiments of the invention relate generally to the field of low-power programming. More particularly, one or more of the embodiments of the invention relate to a method and apparatus for power performance monitors for low-power program tuning.

BACKGROUND OF THE INVENTION

A vast amount of research and system architecture design efforts are directed to increasing data throughput within computer systems. Technologies, such as data pipeline, out-of-order execution and the like, enable advanced architectures in processing with significantly higher clock rates to achieve world class performance. Furthermore, this research, as well as architecture redesign, has enabled the mobile market for laptop computers, hand-held devices, personal digital assistants (PDAs), and the like.

Unfortunately, such mobile platforms may be limited to a run-time dictated by the life of a battery used by the respective mobile platform when another power source is unavailable. Depending on the complexity of the mobile platform, power resources from an attached battery may be depleted within a relatively short amount of time. Furthermore, inclusion of technologies, such as data pipeline, out-of-order execution and the like within a mobile platform generally results in the consumption of inordinate amounts of power during execution. Hence, high performance mobile platforms may not provide a user with a sufficient amount of mobile operation time.

Current Intel® Architecture (IA) Processor Families (IA-32 and IA-64) provide various performance monitors to record information, such as cache miss, branch miss prediction, retired instructions, and the like, with very little overhead, to the executing program. Compilers can also install operating system drivers to record various performance monitor information. In addition, the performance monitoring information is used for the next program compilation to speed-up the code based on a period of typical use. In the past, performance monitors have helped both programmers and compilers to refine generated program code without resorting to traditional probing code that causes substantial overhead or alters program characteristics to render measured statistics unusable.

Unfortunately, in the area of low-power programming, performance monitors for pinpointing portions of an application program that consume more power than remaining portions of the program do not exist. Conventional compilers cannot collect power consumption information of a processor without help from the processor. Hence, without adequate tools, researchers often rely on some low power principles in order to promote their programming or computing strategies as requiring low power. Such practices often present inaccurate accounts of what really happens in the processor. Researchers often correlate low power to performance. Consequently, most performance enhancing operations that achieve the same throughput with less time are erroneously labeled as low-power technologies.

BRIEF DESCRIPTION OF THE DRAWINGS

The various embodiments of the present invention are illustrated by way of example, and not by way of limitation, in the figures of the accompany drawings, and in which:

FIG. 7 is a flowchart illustrating a method for updating power consumption fields of processed micro-operations by functional units of a micro-architecture, in accordance with one embodiment.

FIG. 8 is a flowchart illustrating a method for incrementing a power consumption field of one or more identified micro-operations by a determined power consumption level, in accordance with one embodiment.

DETAILED DESCRIPTION

A method and apparatus for power performance monitors for low-power program tuning are described. In one embodiment, the method includes the computation of power consumption levels of instructions of an application. Once consumption levels are computed, instruction sequences of the application are identified that exhibit an excess power consumption level. For the identified instruction sequences, the application program is recompiled to reduce power consumption levels of one or more of the identified instruction sequences.

In one embodiment, in situations where power consumption by an instruction sequence cannot be reduced, utilization of functional units required to execute the instruction sequence is monitored. Hence, the instruction sequence may be executed during periods of time when utilization of the functional units is below a predetermined level. In one embodiment, power consumption levels of the instructions of an application program are reduced, and in addition to the power consumption reduction, utilization of functional units may be reduced to prevent overheating.

System

Figure 1:
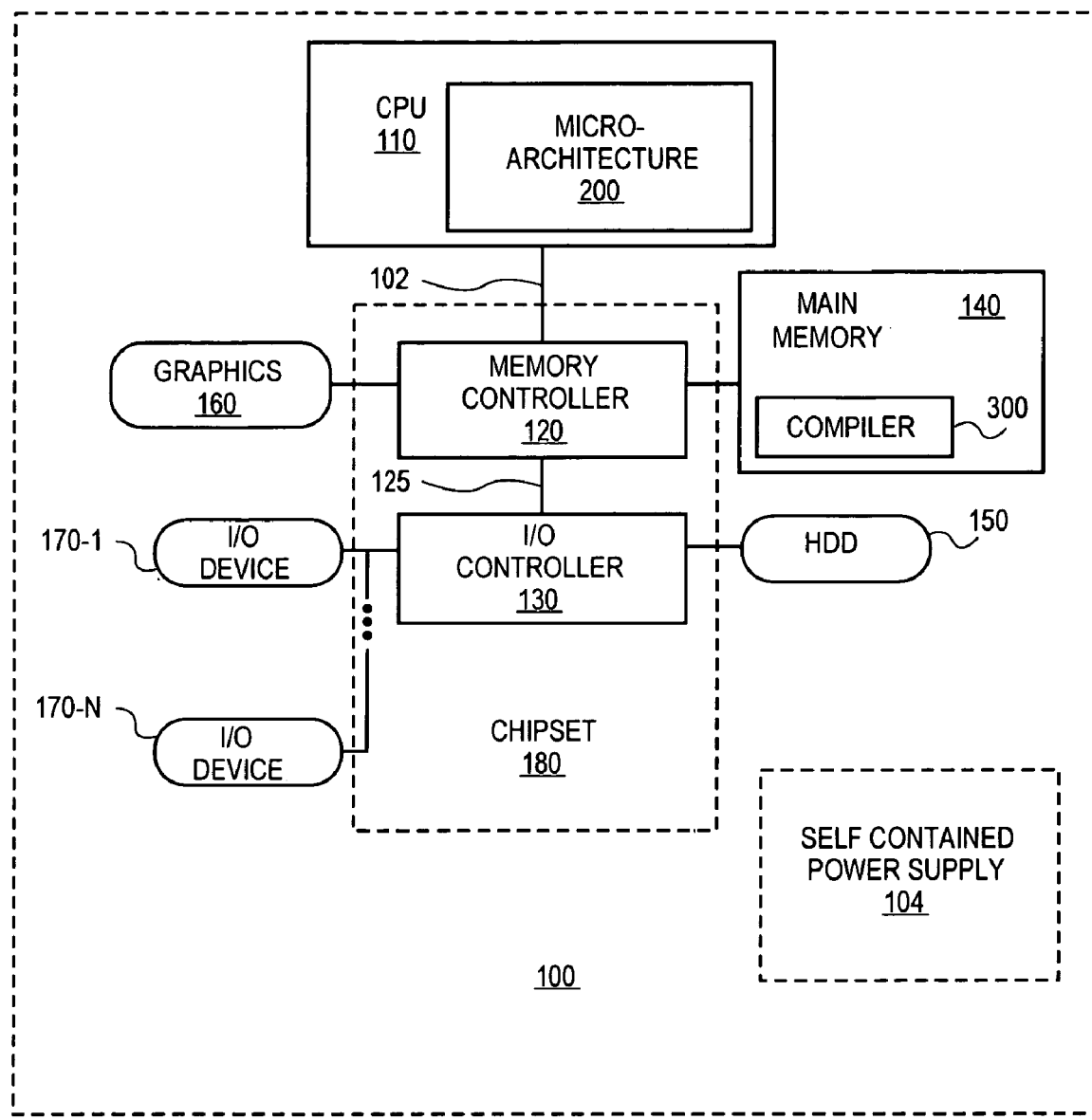
FIG. 1 is a block diagram illustrating a computer system, including a power optimization compiler, in accordance with one embodiment.

FIG. 1 is a block diagram illustrating a computer system 100 including a processor 110 having micro-architecture 200, in accordance with one embodiment of the invention. In one embodiment, computer system 100 includes a power optimization compiler 300 to recompile an application program to reduce power consumption levels of one or more identified instruction sequences having an excess power consumption level, in accordance with one embodiment. Computer system 100 comprises a processor system bus (front side bus (FSB)) 102 for communicating information between the processor (CPU) 110 and a chipset 180 coupled together via FSB 102.

As described herein, the term "chipset" is used in a manner well-known to those skilled in the art to describe collectively the various devices coupled to CPU 110 to perform desired system functionality. Chipset 180 is comprised of a memory controller or memory controller hub (MCH) 120, as well as an input/output (I/O) controller or I/O controller hub (ICH) 130. In one embodiment, I/O bus 125 couples MCH 120 to ICH 130. Memory controller 120 of chipset 180 is coupled to main memory 140 and one or more graphics devices or graphics controller 160.

In one embodiment, main memory 110 is volatile memory, including but not limited to, random access memory (RAM), synchronous RAM (SRAM), double data rate (DDR) S-data RAM (SDRAM), Rambus data RAM (RDRAM), or the like. In addition, hard disk drive devices (HDD) 150, as well as one or more I/O devices 170 (170-1, . . . , 170-N) are coupled to I/O controller 130 of chipset 180. As illustrated, CPU 110 includes micro-architecture 200 to compute power consumption levels required to execute the instructions of an application program, in accordance with one embodiment of the invention, as illustrated in to FIG. 2.

It should be understood that embodiments of the invention may be used in any apparatus having a processor. Although embodiments of system 100 are not limited in this respect, system 100 may be a portable device that include a self contained power supply (source) 104, such as a battery. A non-exhaustive list of examples of such portable devices includes laptop and notebook computers, mobile telephones, personal digital assistants (PDAs), and the like. Alternatively, system 100 may be a non-portable device, such as, for example, a desktop computer or a server computer not including optional source 104.

Unfortunately, such mobile platforms may be limited to a run-time dictated by the life of a battery used by the respective mobile platform when another power source is unavailable. Depending on the complexity of the mobile platform, power resources from an attached battery may be depleted within a relatively short amount of time. Furthermore, inclusion of technologies, such as data pipeline, out-of-order execution and the like within a mobile platform generally results in the consumption of inordinate amounts of power during execution. Hence, high performance mobile platforms may not provide a user with a sufficient amount of mobile operation time.

Figure 2:
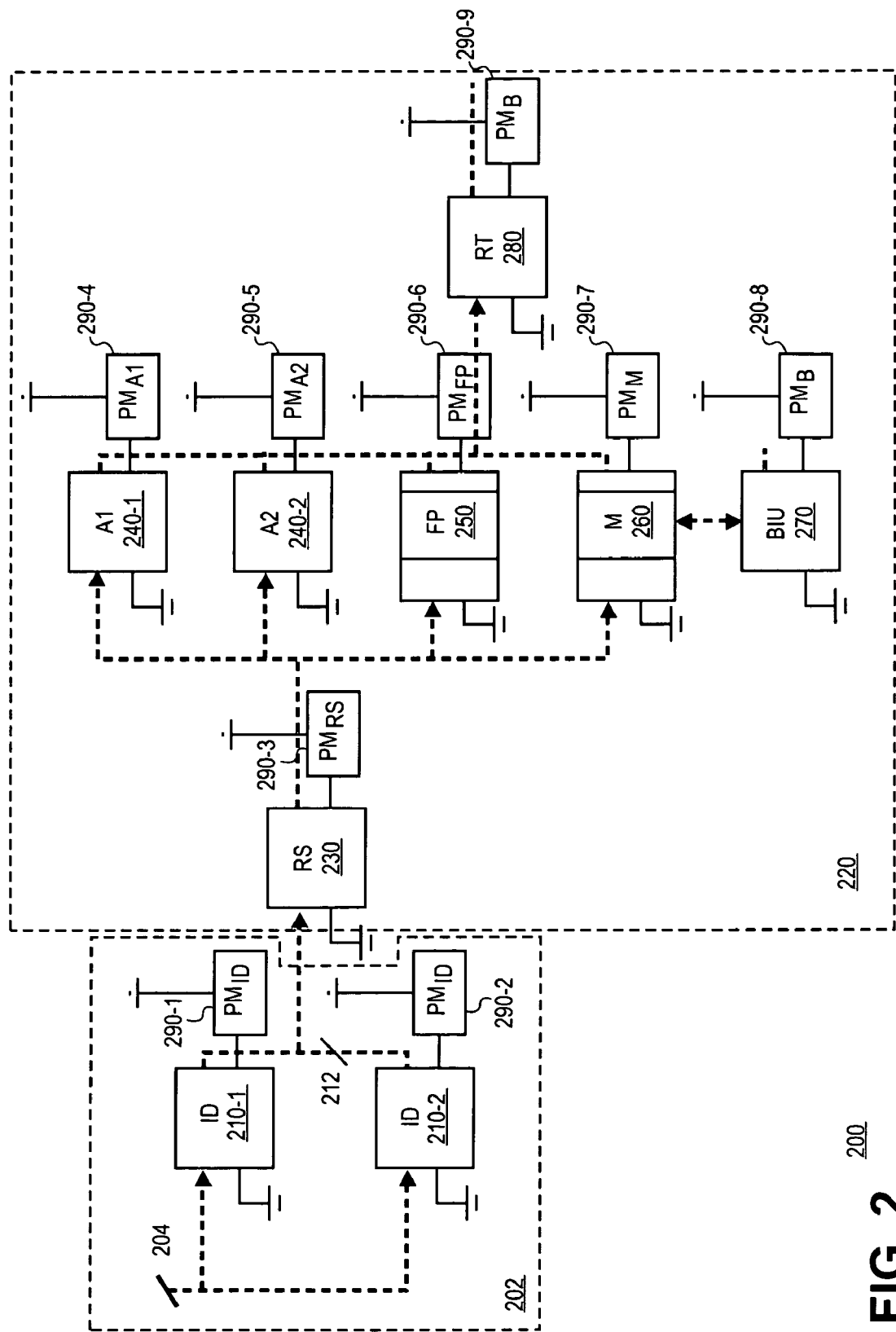
FIG. 2 is a block diagram illustrating a micro-architecture, as depicted in FIG. 1, configured to compute power consumption levels required to execute the instructions of an application program, in accordance with one embodiment.

Accordingly, in one embodiment, micro-architecture 200 includes power consumption meters (PM) to assist compiler 300 in pinpointing portions of an application program that consume more power than remaining portions of the program, as illustrated in FIG. 2. In one embodiment, compiler 300 determines power consumption information associated with instructions (sequences) at sampled program counters. Compiler 300 can use this information to identify which part of the application program consumes the most of the power and switch to alternative algorithms or optimization strategies to achieve less power consumption. In one embodiment, a run-time analyzer receives constant feedback to recompile the program to achieve lower power consumption for a given performance goal. Hence, compiler 300 can strike a good balance between performance and power consumed while providing a specified throughput.

Representatively, micro-architecture 200 is configured to perform dynamic execution. As described herein, "dynamic execution" refers to the use of front-end logic 202 to fetch the next instructions according to program order and prepare the instructions for subsequent execution in the system pipeline. Accordingly, an instruction fetch unit (IFU) (not shown) of front end logic 202 fetches macro-instructions via bus interface unit (BIU) 270. Once the instructions are fetched, the instructions are decoded into basic operations, referred to herein as "micro-operations" (uOPs). In response to received macro-instruction 204, an instruction decoder (ID) 210 (210-1, 210-2), decodes the macro-instruction into one or more uOPs which are provided to instruction decoder queue (IDQ) (not shown) and subsequently to out-of-order (OOO) core 220.

In effect, the front-end logic 202 supplies a high bandwidth stream of decoded instructions to OOO core 220, which directs execution (the actual completion) of the instructions. In order to execute the instructions in the most efficient manner, front-end logic 202 may utilize highly accurate branch prediction logic (not shown) in order to speculate where a program is going to execute next, or as referred to herein, dynamic execution. Once received, uOPs are scheduled to avoid stalling when following delayed instructions. In other words, uOPs are executed in an "out-of-order" execution fashion when required to ensure the most efficient use of available processor resources.

Representatively, reservation station (RS) 230 of OOO core 220 receives decoded uOPs 212 from front-end logic 202. In one embodiment, uOPs 212 received by RS 230 remain in RS 230 to await arrival of referenced source operands. Once source operands of the respective uOP are received, RS 230 schedules the execution of the respective uOP within one or more execution units, including arithmetic logic units (ALU) 240 (A1 240-1, A2 240-2) to handle simple arithmetic and logic operations. Likewise, reservation schedules execution of floating point instructions within floating point unit (FP) pipeline 250. As described herein, FP 250 and ALUs 240 are collectively referred to as execution units.

In one embodiment, execution units use a memory unit pipeline (M) 260, which uses a bus and memory subsystem block (BIU) 270 to execute received uOPs. Subsequently, executed uOPs are received by retirement unit (RT) 280. In one embodiment, RT 280 receives the completion status of executed uOPs from execution units 240-250 and processes the results to commit (retire) a proper architectural state according to the program order. As described herein, the term "functional units" (FUs) refers to the various components (210-280) of front-end logic 202 and OOO core 220 used to schedule and execute uOPs.

However, in contrast to conventional micro-architectures, micro-architecture 200 includes a respective power meter (PM) 290 (290-1, . . . , 290-9), which is coupled to the various FUs (210-280), of micro-architecture 200. In one embodiment, PM 290 are configured to measure power consumed by an attached FU (210-280) during a program cycle. In one embodiment, an FU (210-280), such as, for example a decoder (ID 210), includes an attached PM (e.g., 290) configured to measure power consumed by ID 210 during, foe example, a program cycle.

In one embodiment, FUs (210-280) communicate with an attached PM 290 to receive power consumption values measured by the attached PM 290 during a program cycle. In one embodiment, FUs (210-280) enable the measurement of power consumption levels consumed by instructions of an application program during execution. Representatively, PMs, as described herein, are placed on die, and directly coupled to respective FUs of the micro-architecture to provide a virtually exact measurement of power consumed by the respective FU during a program cycle.

Figure 3:
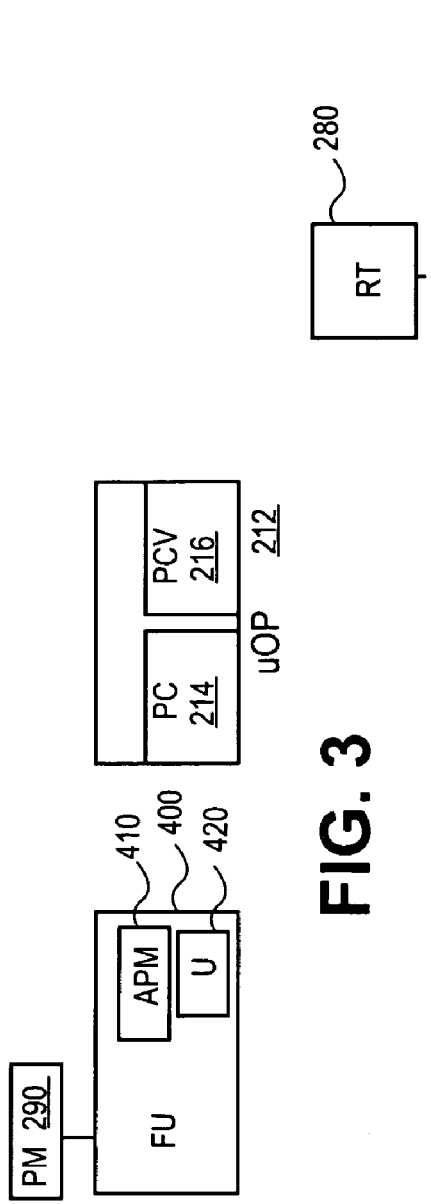
FIG. 3 is a block diagram further illustrating a functional unit and a micro-operation of FIG. 2, in accordance with one embodiment.

In one embodiment, as illustrated with reference to FIG. 3, uOP 212 includes a program counter (PC) field 214, as well as a power consumption value (PCV) field 216. Accordingly, during initial decoding of a received macro instruction, a program counter value associated with the macro instruction 204 is placed within PC field 214 of each uOP decoded from macro instruction 204. However, certain complex macro instructions may require decoding into multiple uOPs. Accordingly, as a uOP transitions between the various FUs (210-280) of micro-architecture 200, the various FUs (210-280), in one embodiment, query an attached power meter 290 to determine a power consumption value consumed by the respective FUs (210-280) to process one or more uOPs during a program cycle.

In one embodiment, FUs (210-280) repeat querying of their respective PM 290 to receive a power consumption value. In one embodiment, the power consumption value is used to increment PCV field 216 of uOP 212. Hence, once uOP 212 is executed and reaches RT 280, PCV field 216 contains a power consumption value representing a summation of the power consumed by each FU (210-280) required to process the respective uOP during execution. Accordingly, in one embodiment, RT 280 updates an internal power history buffer (PHB) 380 (See FIG. 4) prior to retirement of each received, executed uOP.

Hence, in one embodiment, RT 280 determines a program counter value according to PC field 214 of the executed uOP 212 and updates an entry within internal PHB corresponding to the PC value of executed uOP 212. In one embodiment, internal PHB may be implemented within, for example, hardware registers of micro-architecture 200 (not shown). In one embodiment, internal PHB includes a fixed number of entries. Hence, generation of new entries by RT 280 within the internal PHB may cause flushing of least recently updated entries of the internal PHB ("PHB overflow event"). In one embodiment, the internal PHB may be implemented within one or more 128-bit registers to avoid PHB overflow events.

Figure 4:
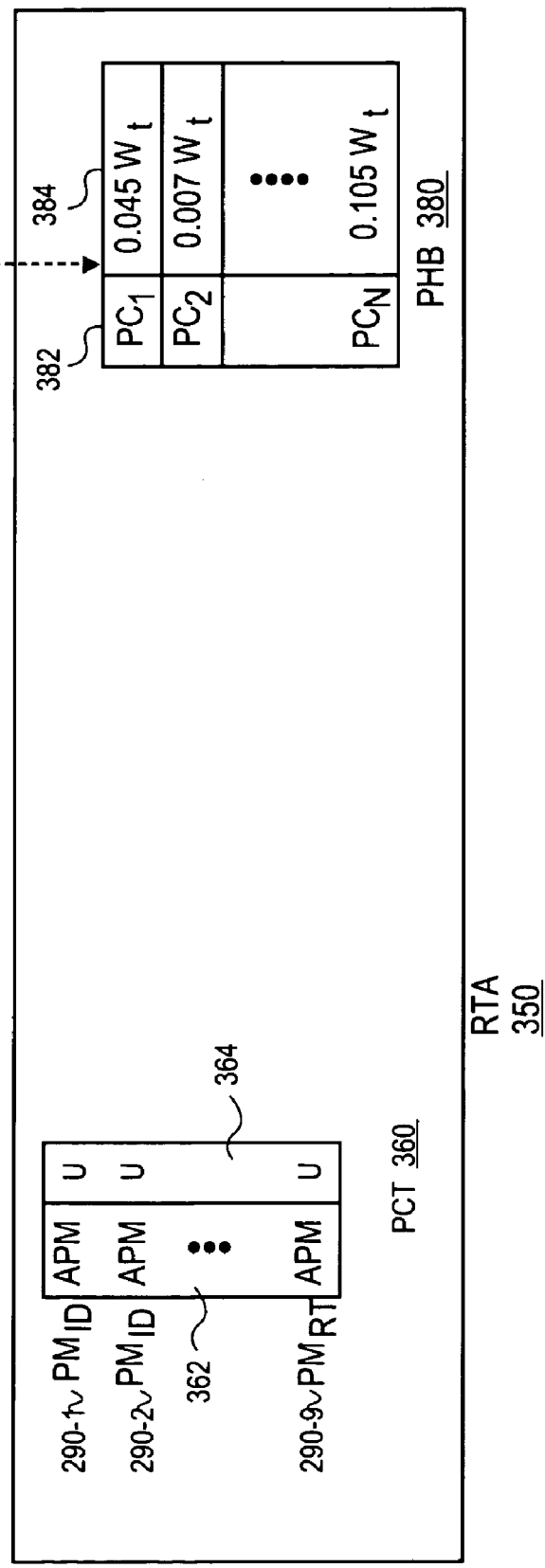
FIG. 4 is a block diagram further illustrating a run-time optimizer of the compiler of FIG. 1, to identify instruction sequences of an application program having an excess power consumption level, in accordance with one embodiment.

In one embodiment, a run-time analyzer (RTA) 350 may utilize an operating system (OS) driver to periodically issue an interrupt in order to read values from the internal PHB to form PHB 380, as illustrated in FIG. 4. Representatively, PHB 380 includes PC column 382, as well as power consumption value (PCV) column 384. Hence, once each uOP decoded from a received macro instruction is executed within micro-architecture 200, PCV column 420 will represent power consumed by the respective macro instruction. In one embodiment, RTA 350 periodically issues an interrupt to read values from the internal PHB to update PHB 380 and may use the various program power consumption information to identify instruction sequences of the application program having an excess power consumption level.

Referring again to FIG. 3, FU 400 is illustrated, which may be used as an FU (210-280) of micro-architecture 200 of FIG. 2, in one embodiment. Representatively, in one embodiment, FU 400 includes an average power meter (APM) field (register) 410, as well as a utilization (U) field (register) 420. In one embodiment, FU 400 updates APM register 410 according to a measured power consumption value divided by a number of uOPs processed by FU 400 during the program cycle ("power consumption per cycle value"). In one embodiment, FU 400 accumulates the power consumption per cycle value to generate an average power amount consumed by FU 400 within APM register 410.

In a further embodiment, in addition to keeping track of average power consumed, each FU (210-280) may also track the utilization (i.e., total cycles divided by cycles doing real work (non-idle cycles) within, for example, U register 420, as illustrated with reference to FIG. 3. In one embodiment, U register 420 is implement using two registers. For example, a first register could be used to contain a count of the total cycles. In addition, a second register could be used to contain a count of the total non-idle cycles. In one embodiment, the first and second registers are 128-bit registers.

Hence, in one embodiment, as illustrated in FIG. 4, an operating system (OS) driver, for example, as directed by RTA 350 can read the various U registers 420, as well as APM register 410 of FU 400 for identifying typical power usage for each FU 210-280. Representatively, RTA 350 maintains power consumption table (PCT) 360 according to APM register 410 as stored in APM column 362, and U register 420 of FU 210-280. In one embodiment PCT 360 as well as PHB 380 are implemented by as stored in column 364, using one or more registers, such as 128-bit registers, that are accessible by both RTA 350 as well as OS drivers. Representatively, RTA 350 is implemented as a software component, but may be implemented as hardware component, depending on the desired implementation.

In one embodiment, compiler 300 may utilize information from APM registers 410, as well as information from U registers 420, in order to identify instruction sequences that are executed by FUs having an APM value in excess of a predetermined FU power consumption level. In one embodiment, such identified "high power instruction sequences" may be replaced with alternative instruction sequences to utilize FUs having an average power consumption level, less than a predetermined FU power consumption level. In a further embodiment, when alternate instruction sequences are not available, compiler 300 delays issuing of identified high power instruction sequences and limits issuing of such instruction sequences to FUs during identified low utilization times, according to U registers 420. Procedural methods for implementing embodiments of the invention are now described.

Operation

Figures 5, 6:
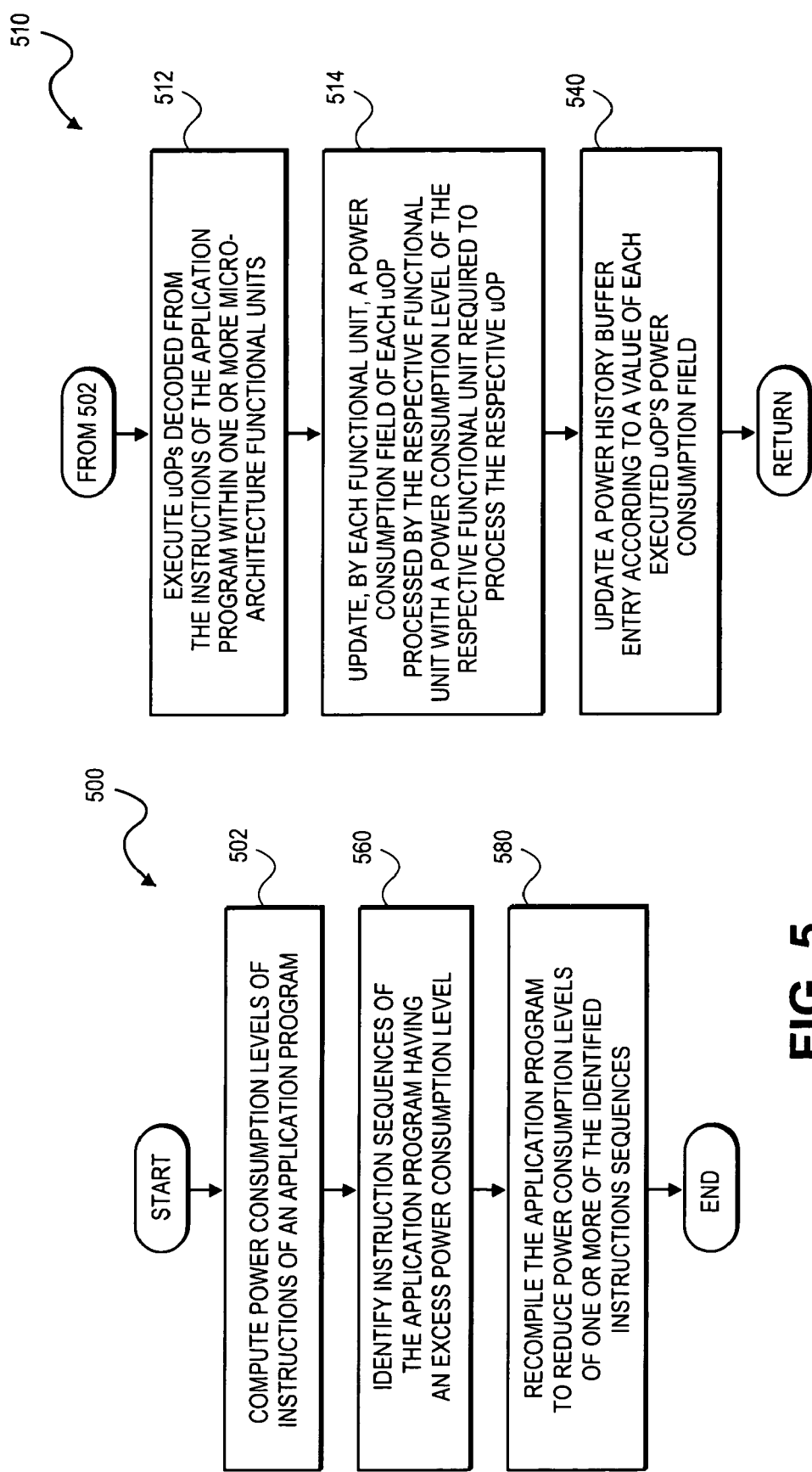
FIG. 5 is a flowchart illustrating a method for recompiling an application program to reduce power consumption levels of identified instruction sequences having an excess power consumption level, in accordance with one embodiment.
FIG. 6 is a flowchart illustrating a method for computing power consumption levels of instructions of an application program, in accordance with one embodiment.

FIG. 5 is a flowchart illustrating a method 500 for recompiling an application program to reduce power consumption levels of one or more identified instruction sequences having an excess power consumption level, in accordance with one embodiment, as described with reference to FIGS. 1-4. At process block 502, power consumption levels are computed for the instructions of an application program. At process block 560, instruction sequences of the application program are identified having an excess power consumption level. As described herein, instructions having an excess power consumption level may include instructions that belong to critical power path instruction sequences, such as instruction sequences that are part of a critical path that exhibits an excess power consumption level.

In one embodiment, identified instruction sequences having an excess power consumption level may belong to high power level instruction sequences. As described herein, high power level instruction sequences include instructions executed by function units (FU) of a micro-architecture having an power consumption level in excess of the predetermined FU power consumption level. Once instruction sequences are identified, at process block 580, the application program is recompiled to reduce power consumption levels of one or more of the identified instruction sequences. In an alternate embodiment, the application program is recompiled to reduce overheating of the various functional units of a processor micro-architecture.

FIG. 6 is a flowchart illustrating a method 510 for computing power consumption levels of instructions of process block 502 of FIG. 5, in accordance with one embodiment. At process block 512, micro-instructions (uOPs) decoded from instructions of the application program, are executed within one or more micro-architecture functional units (FU). At process block 514, each FU updates a power consumption field of each uOP processed by the respective FU with a power consumption level of the respective FU required to process the respective uOP.

Hence, as illustrated with reference to FIGS. 2 and 3, the various FU (210-280) update, for example, PCV field 216 of uOP 212. Once updated, at process block 540, a power history buffer (PHB) entry is updated according to the value of each executed micro-operations power consumption field. Hence, in one embodiment, as illustrated with reference to FIG. 2, prior to retirement by RT 280, a value of PCV field 216 of each uOP 212 is updated within an internal PHB of RT 280. In one embodiment, a run-time analyzer (RTA) 350 updates PHB 380 according to the internal PHB of RT 280, as illustrated with reference to FIG. 4.

FIG. 7 is a flowchart illustrating a method 520 for updating the power consumption field of process block 514 of FIG. 6, in accordance with one embodiment. At process block 522, a power consumption level of an FU is determined for the program cycle. In one embodiment, determination of the power consumption level of an FU is performed by querying a power consumption meter (PM) coupled to the FU, for example, as illustrated with reference to FIG. 2. Once queried, PM 290 returns a power consumption level measured by the PM 290 during the program cycle. At process block 524, one or more uOPs processed by the FU during the program cycle are identified.

Hence, as illustrated with reference to FIG. 2, FU (210-280) keeps track of various uOPs processed during a program cycle. At process block 526, a value of a power consumption field of the more and more identified uOPs is incremented by the determined power consumption level. Hence, at process block 538, process blocks 522-526 are repeated for each program cycle. As described herein, micro-architecture 200 of FIG. 2 represents a processor pipeline, which performs parallel execution of various uOPs. Hence, in one embodiment, methods 510 and 520 are performed in parallel by each FU (210-280) of micro-architecture 200.

FIG. 8 is a flowchart illustrating a method 528 for incrementing the PCV field of process block 526 of FIG. 7. At process block 530, the determined power consumption level is divided by a count of identified uOPs processed during the program cycle to form a power consumption per cycle value. Once formed, at process block 532, the PCV field of the identified uOPs is incremented by the power consumption per cycle value. At process block 534, an average power consumption meter (APM) of the FU is incremented by the power consumption per cycle value. At process block 536, a utilization register (meter) of the FU is incremented for the program cycle.

In one embodiment, each APM 410 contains a total power consumed divided by a total number of uOPs processed for the respective FU (e.g. 210-280). In an alternate embodiment, a first 128-bit integer register, containing a sum of total power consumed for the respective FU, is incremented by the amount of power each new uOP consumes when processed by the respective FU (210-280). In addition, a second 128-bit integer register, containing a sum of the total number of uOPs processed by the respective FU, is incremented for each new uOP processed by the respective FU. Representatively, RTA 350 or an OS driver samples the first and second 128-bit registers and divides the sampled values off-line in order to store an APM value for the respective FU within PCT 360 (see FIG. 4).

Figure 9:
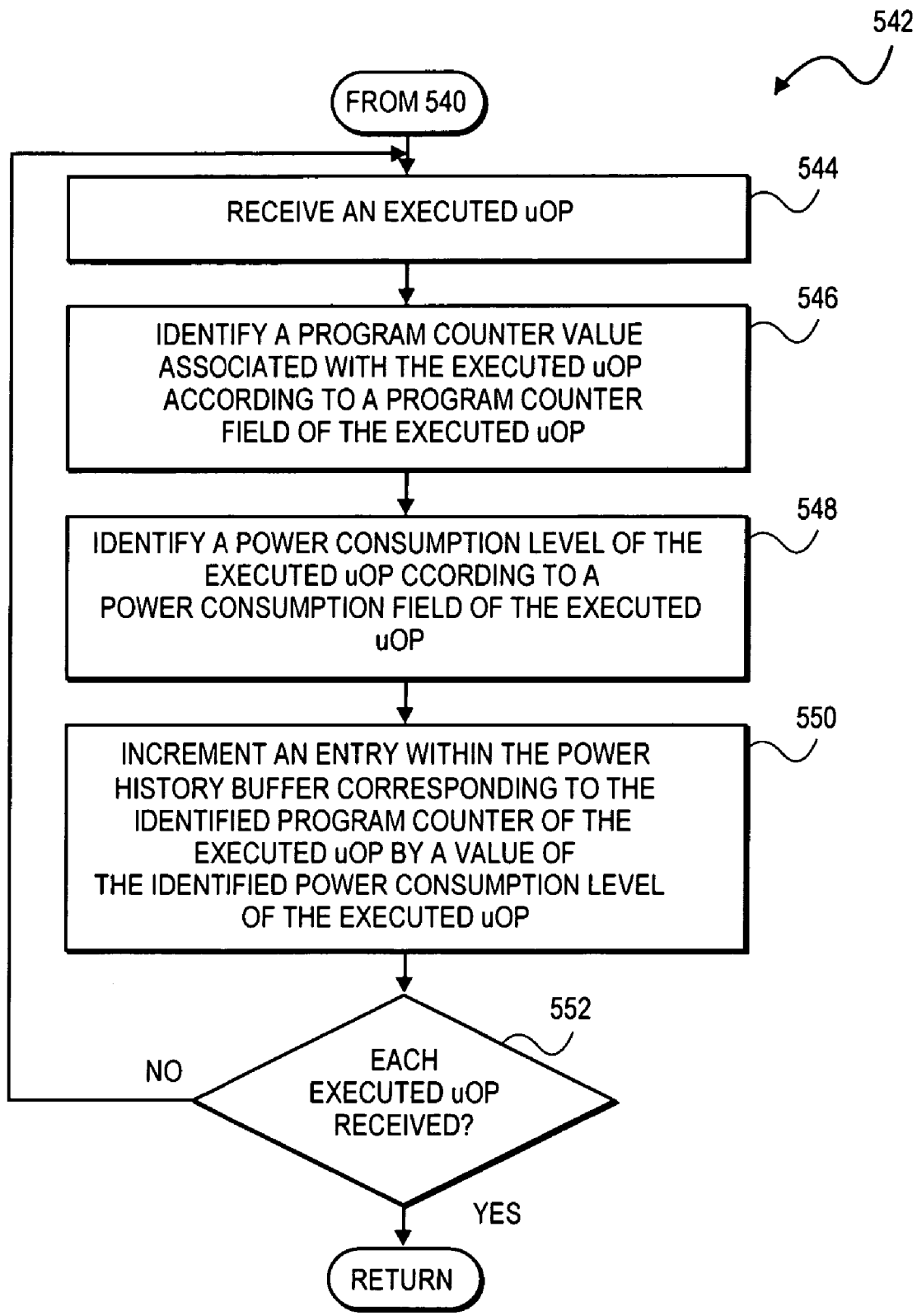
FIG. 9 is a flowchart illustrating a method for updating a power history buffer entry according to a value of each executed micro-operations power consumption field, in accordance with one embodiment.

FIG. 9 is a flowchart illustrating a method 542 for updating the internal PHB of process block 540 of FIG. 6, in accordance with one embodiment. At process block 544, an executed uOP is received. Once received, at process block 546, a program counter value associated with the executed uOP is identified according to a PC field of the executed uOP. At process block 548, a power consumption level associated with the executed uOP is identified according to the PCV field of the executed uOP.

At process block 550, an entry within the internal PHB corresponding to the PC field value of the executed uOP is incremented by a value of the PCV field of the executed uOP. At process block 552, process blocks 544-550 are repeated for each received executed uOP. In one embodiment, method 542 describes operations performed by RT 280, for example, as illustrated with reference to FIG. 4, for updating an internal PHB which is read by RTA 350 to form PHB 380.

Figure 10:
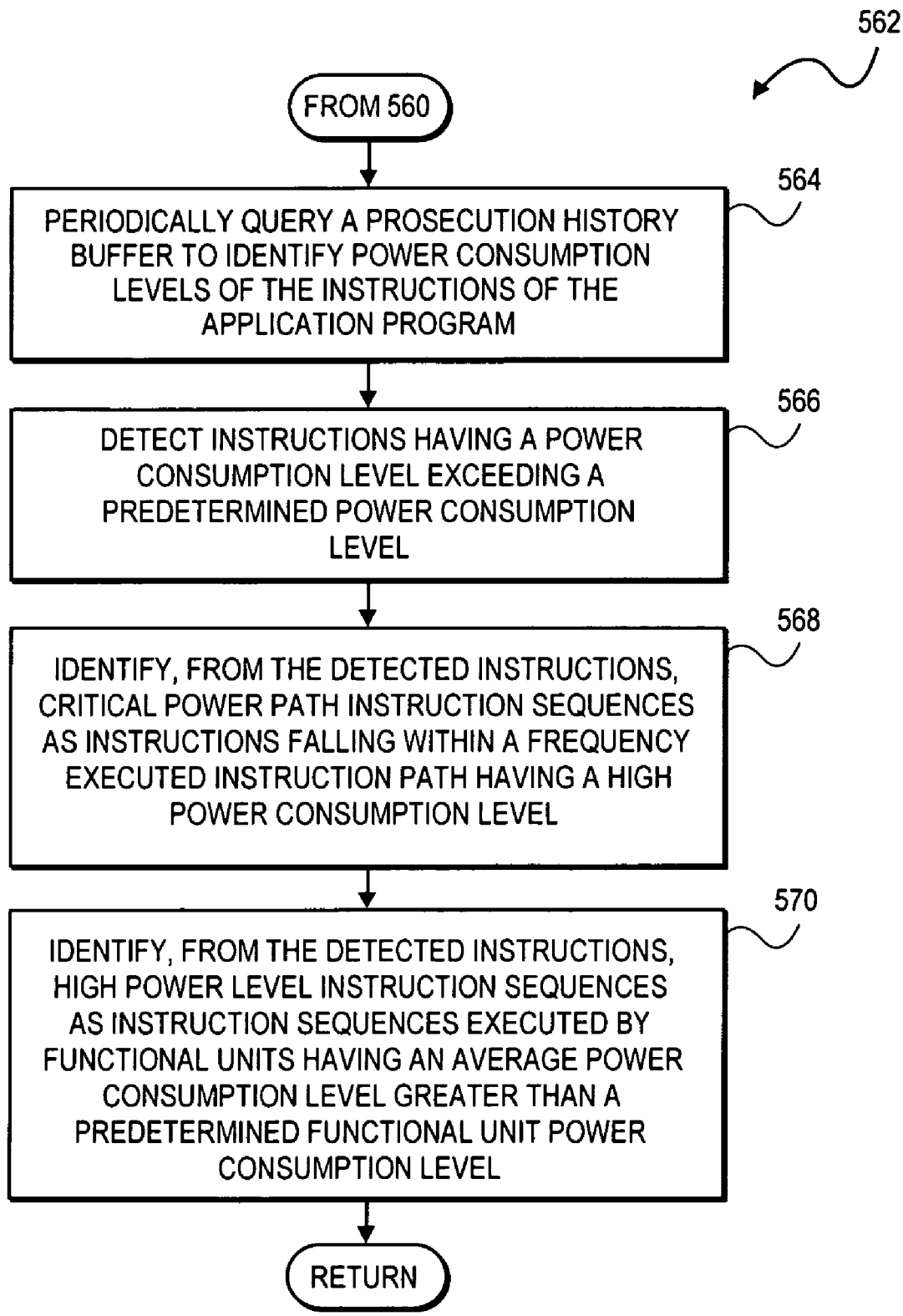
FIG. 10 is a flowchart illustrating a method for identifying instruction sequences of an application program having an excess power consumption level, in accordance with one embodiment.

FIG. 10 is a flowchart illustrating a method 562 for identifying instruction sequences having an excess power consumption level of process block 560 of FIG. 5, in accordance with one embodiment. At process block 564, the internal PHB is periodically queried to identify power consumption levels of the instructions of the application program. In one embodiment, CPU 110 may issue an interrupt at predetermined cycles or occurrences of an internal PHB overflow event to enable a driver to record contents of the internal PHB, which may optionally be cleared. In one embodiment, APM values and U values from APM register 410 and U register 420 are read by RTA 350 (FIG. 4). As described herein, querying of the internal PHB is performed since the internal PHB includes a limited number of entries when implemented using registers.

At process block 566, instructions having a power consumption level exceeding a predetermined power consumption level are detected. At process block 568, critical path power instructions are identified from the detected instructions, as instructions that fall within a frequently-executed instruction path having a high power consumption level. In one embodiment, application program critical paths may be identified using conventional techniques. Once identified, the critical paths may be analyzed to determine a power consumption level consumed by the critical paths. For critical paths having an excess power consumption level, such critical paths are identified as critical power path instruction sequences. At process block 570, high power level instruction sequences are identified from the detected instructions as instruction sequences executed by FUs having an average power consumption level greater than a predetermined FU power consumption level.

Figure 11:
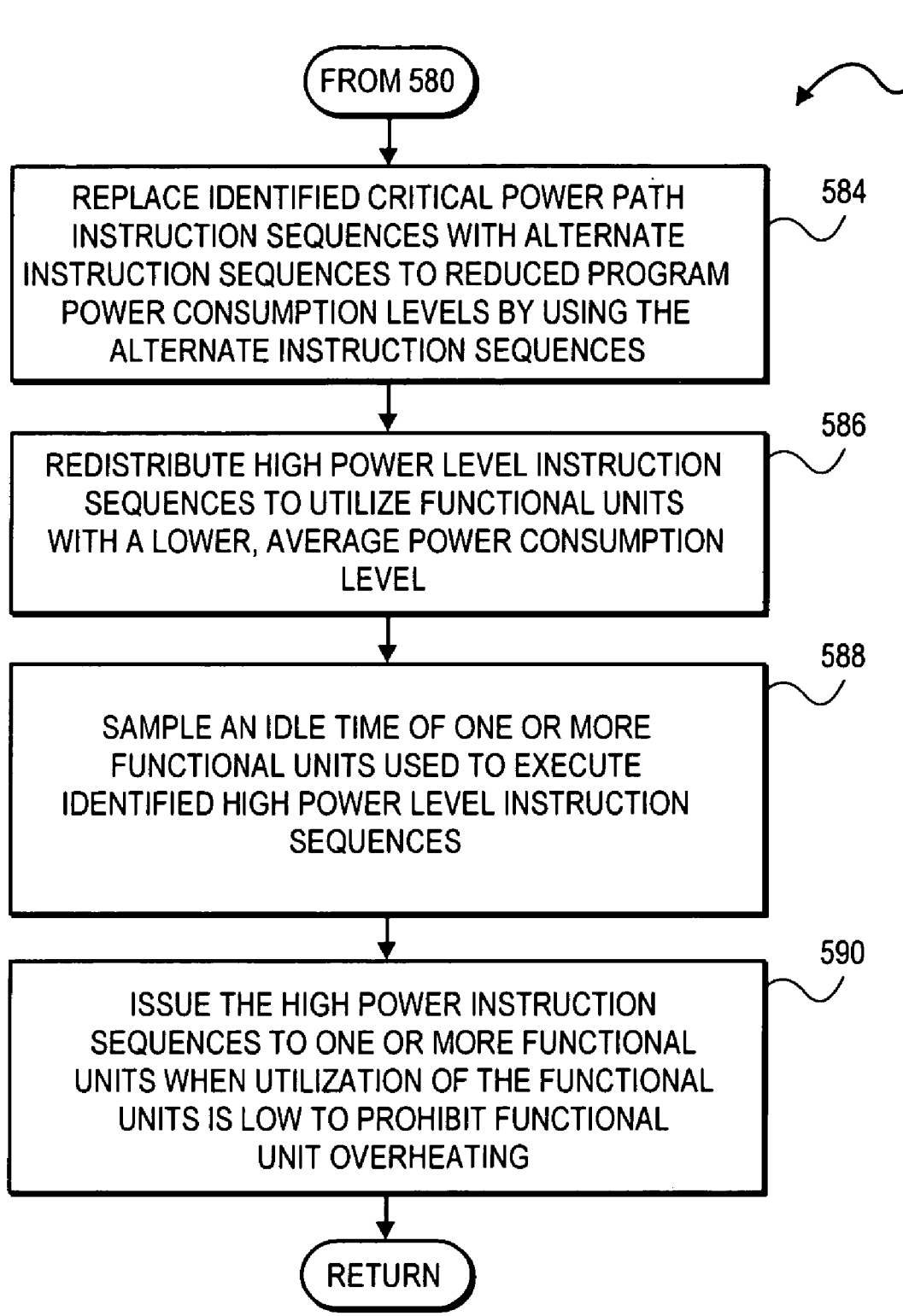
FIG. 11 is a flowchart illustrating a method for recompiling an application program to reduce power consumption levels of one or more identified instruction sequences.

FIG. 11 is a flowchart illustrating a method 582 for recompiling the application program to reduce power consumed by one or more identified instruction sequences having an excess power consumption level of process block 580 of FIG. 5. At process block 584, identified critical power path instruction sequences are replaced with alternate instruction sequences to reduce power consumption levels by using the alternate instruction sequences. At process block 586, high power level instruction sequences are redistributed to utilize FUs with a lower average power consumption level.

At process block 588, a run-time optimizer may identify an idle time of one or more FUs used to execute identified high power level instruction sequences. In one embodiment, this may be performed by accessing, for example, a utilization register of the respective FU. As such, at process block 590, when high power level instruction sequences cannot be redistributed to FUs having a lower average power consumption level, in one embodiment, the compiler may issue high power instruction sequences to one or more FUs when utilization of the FUs is low to prohibit FU overheating.

Accordingly, as described herein, for instructions, which require additional time to complete execution, or for instructions that are on a critical path, such instructions will generally exhibit high power consumption levels, as determined from PHB 380 (FIG. 4). Hence, in one embodiment, techniques may be used to correlate the frequency of execution to adjust power information in post-processing, for example, by RTA 350, as required for applications. Accordingly, as described herein, compiler 300 may use the two tuple field (PC, PCV) sampled over time to identify application programs that have an excess power consumption level.

In one embodiment, an instruction is identified as a high power level instruction when uOPs decoded from the instruction are executed by FUs that exhibit an above-average power consumption level. In addition, identified instruction sequences, which exhibit an excess power consumption level, may include instructions which are decoded into a plurality of uOPs for execution and/or instruction sequences falling into critical paths of the application program. Accordingly, in one embodiment, compiler 300 may replace such instruction sequences with alternative instruction sequences, which consume less power at the expense of slightly decreased performance, while meeting an overall performance goal.

In an alternative embodiment, compiler 300 may sample APM registers by using an OS driver to identify FUs that consume less power. Hence, during recompiling of the application program, compiler 300 may distribute identified instruction sequences having an excess power consumption level to minimize total power consumption of the application program. In a further embodiment, utilization levels of FUs of the micro-architecture are used to issue instructions during identified idle periods of the various FUs. Hence, in one embodiment, the compiler may utilize a dynamic approach to prevent FUs from overheating by issuing identified high-power instruction sequences when identified utilization of an FU is low.

Accordingly, in one embodiment, a PHB is used by a compiler to identify program portions that consume an inordinate amount of power by querying APM registers, as well as U registers, to assist the compiler in implementing different optimization strategies with a different mix of functional units. Although embodiments described herein are directed to a micro-architecture of a processor, the embodiments described herein may be applied to other units, such as storage, computer graphics devices and I/O, such as peripheral interconnect devices. Hence, in one embodiment, power meters may be attached and sampled to similar functional units of attached program components. Hence, the OS can sample power consumed in external units and schedule tasks accordingly to prevent program system components from overheating.

Figure 12:
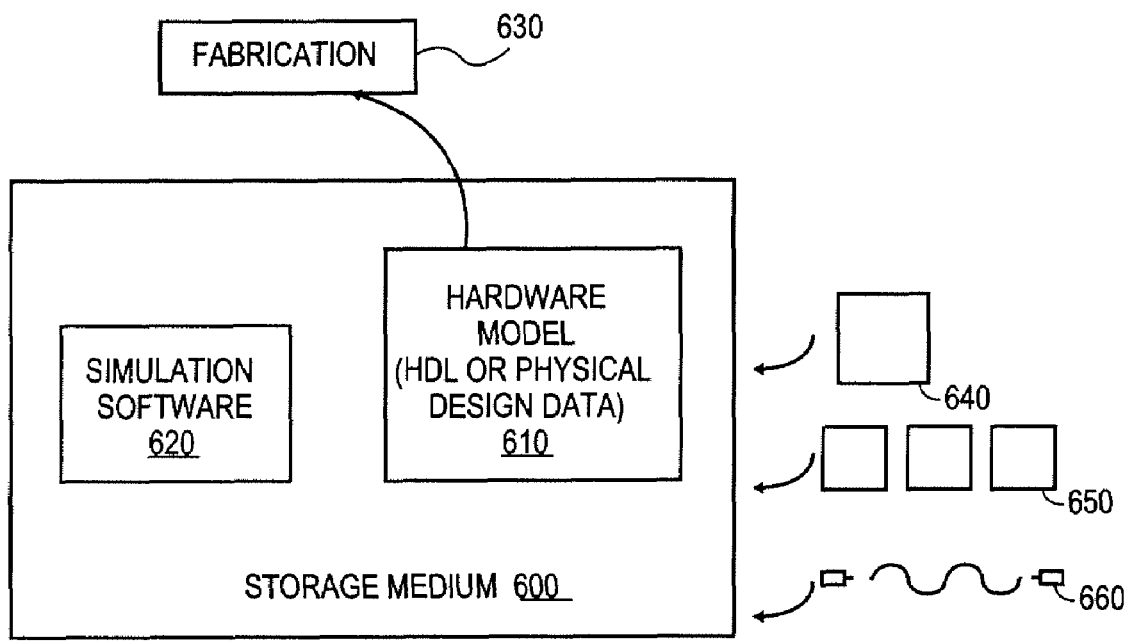
FIG. 12 is a block diagram illustrating various design representations or formats for simulation, emulation and fabrication of a design using the disclosed techniques.

FIG. 12 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 630 to the hardware model to determine if it indeed functions as intended. In some embodiments, the simulation software is not recorded, captured or contained in the medium.

In any representation of the design, the data may be stored in any form of a machine readable medium, a memory 650 or a magnetic or optical storage 640, such as a disk, may be the machine readable medium. Any of these media may carry the design information. The term "carry" (e.g., a machine readable medium carrying information) thus covers information stored on a storage device. The set of bits describing the design or a particular of the design are (when embodied in a machine readable medium, such as a carrier or storage medium) an article that may be sealed in and out of itself, or used by others for further design or fabrication.

It is to be understood that even though numerous characteristics and advantages of various embodiments are set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management in parts within the principles of the embodies of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
    computing power consumption levels of instructions of an application program according to measured power consumption levels at one or more micro-architecture functional units during execution of the applications program;
    identifying instruction sequences of the application program having an excess power consumption level; and
    recompiling the application program to reduce the excess power consumption levels of one or more of the identified instruction sequences.

2. The method of claim 1, wherein computing power comprises:
  executing micro-operations decoded from the instructions of the application program within the one or more micro-architecture functional units;
  updating, by each functional unit, a power consumption field of each micro-operation processed by the respective functional unit with the measured power consumption level of the respective functional unit required to process the respective micro-operation during the micro-operation execution; and
  prior to retiring each executed micro-operation, updating a power history buffer entry according to a value of each executed micro-operation's power consumption field.

3. The method of claim 2, wherein updating a power consumption field comprises:
  (i) determining the measured power consumption level of the respective functional unit for a program cycle;
  (ii) identifying one or more micro-operations processed during the program cycle;
  (iii) incrementing the value of the power consumption field of the one or more identified micro-operations by the measured power consumption level; and
  (iv) repeating (i)-(iii) for each program cycle by each of the one or more functional units.

4. The method of claim 3, wherein determining the power consumption level comprises:
  querying a power consumption meter coupled to the respective functional unit; and
  receiving a power consumption level measured by the power consumption meter during the program cycle as the measured power consumption level.

5. The method of claim 3, wherein prior to incrementing, the method comprises:
  dividing the measured power consumption level by a count of the identified micro-operations during the program cycle to form a power consumption per cycle value;
  incrementing the power consumption field of the identified micro-operations by the power consumption per cycle value;
  updating an average power consumption meter of the functional unit according to the power per consumption cycle value; and
  updating a utilization meter of the respective functional unit for the program cycle.

6. The method of claim 3, wherein updating the power history buffer comprises:
  (i) receiving an executed micro-operation;
  (ii) identifying the program counter value associated with the executed micro-operation according to the program counter field of the executed micro-operation;
  (iii) identifying a power consumption level associated with the executed micro-operation according to a power consumption field of the executed micro-operation;
  (iv) incrementing an entry within the power history buffer corresponding to the identified program counter of the executed micro-operation by the identified power consumption level of the executed micro-operation; and
  (v) repeating (i)-(iv) for each received, executed micro-operation.

7. The method of claim 1, wherein identifying further comprises:
  periodically querying a power history buffer to identify the power consumption levels of the instructions of the application program;
    detecting instructions having a power consumption level exceeding a predetermined power consumption level;
    identifying, from the detected instructions, critical power path instruction sequences as instructions falling within a frequently executed instruction path; and
    identifying, from the detected instructions, the instruction sequences having the excess power consumption level as instruction sequences executed by functional units having an average measured power consumption level greater than a predetermined measured power consumption level.

8. The method of claim 1, wherein recompiling comprises:
  replacing identified critical power path instruction sequences with alternate instruction sequences to reduce program power consumption levels by using the alternate instruction sequences.

9. The method of claim 1, wherein recompiling further comprises:
  redistributing high power level instruction sequences to utilize functional units with a lower, average power consumption level.

10. The method of claim 1, further comprising:
  sampling an idle time of one or more functional units used to execute identified high power level instruction sequences; and
  issuing the high power instruction sequences to one or more functional units when utilization of the functional units is low to prohibit functional unit overheating.

11. An article of manufacture including a machine readable medium having stored thereon instructions which may be used to program a system to perform a method, comprising:
  computing power consumption levels of instructions of an application program according to measured power consumption levels at one or more micro-architecture functional units during execution of the applications program;
  identifying instruction sequences of the application program having an excess power consumption level; and
  recompiling the application program to reduce the excess power consumption levels of one or more of the identified instruction sequences.

12. The article of manufacture of claim 11, wherein computing power comprises:
  executing micro-operations decoded from the instructions of the application program within one or more micro-architecture functional units;
  updating, by each functional unit, a power consumption field of each micro-operation processed by the respective functional unit with the measured power consumption level of the respective functional unit required to process the respective micro-operation during the micro-operation execution; and
  prior to retiring each executed micro-operation, updating a power history buffer entry according to a value of each executed micro-operation's power consumption field.

13. The article of manufacture of claim 12, wherein updating a power consumption field comprises:
(i) determining the measured power consumption level of the respective functional unit for a program cycle;
(ii) identifying one or more micro-operations processed during the program cycle;
(iii) incrementing the a value of the power consumption field of the one or more identified micro-operations by the measured power consumption level; and
(iv) repeating (i)-(iii) for each program cycle by each of the one or more functional units.

14. The article of manufacture of claim 13, wherein determining the power consumption level comprises:
querying a power consumption meter coupled to the respective functional unit; and
receiving a power consumption level measured by the power consumption meter during the program cycle as the measured power consumption level.

15. The article of manufacture of claim 13, wherein prior to incrementing, the method comprises:
dividing the measured power consumption level by a count of identified the micro-operations during the program cycle to form a power consumption per cycle value;
incrementing the power consumption field of the identified micro-operations by the power consumption per cycle value;
updating an average power consumption meter of the respective functional unit according to the power per consumption cycle value; and
updating a utilization meter of the functional unit for the program cycle.

16. The article of manufacture of claim 13, wherein updating the power history buffer comprises:
(i) receiving an executed micro-operation;
(ii) identifying a program counter value associated with the executed micro-operation according to a program counter field of the executed micro-operation;
(iii) identifying the power consumption level associated with the executed micro-operation according to the power consumption field of the executed micro-operation;
(iv) incrementing an entry within the power history buffer corresponding to the identified program counter of the executed micro-operation by the identified power consumption level of the executed micro-operation; and
(v) repeating (i)-(iv) for each received, executed micro-operation.

17. The article of manufacture of claim 11, wherein identifying further comprises:
periodically querying a power history buffer to identify the power consumption levels of the instructions of the application program;
detecting instructions having a power consumption level exceeding a predetermined power consumption level;
identifying, from the detected instructions, critical power path instruction sequences as instructions falling within a frequently executed instruction path; and
identifying, from the detected instructions, the instruction sequences having the excess power consumption level as instruction sequences executed by functional units having an average measured power consumption level greater than a predetermined average measured power consumption level.

18. The article of manufacture of claim 11, wherein recompiling comprises:
replacing identified critical power path instruction sequences with alternate instruction sequences to achieve reduced instruction power consumption levels by using the alternate instruction sequences.

19. The article of manufacture of claim 11, wherein recompiling further comprises:
redistributing high power level instruction sequences to utilize functional units with a lower, average power consumption level.

20. The article of manufacture of claim 11, further comprising:
sampling an idle time of one or more functional units used to execute identified high power level instruction sequences; and
issuing the high power instruction sequences to one or more functional units when utilization of the functional units is low to prohibit functional unit overheating.

21. An apparatus comprising:
at least one functional unit to execute micro-operations decoded from instructions of an application program, the functional unit to compute power consumption levels of instructions of an application program according to measured power consumption levels at the at least one functional unit during execution of the applications program; and
a memory coupled to the functional unit, the memory including a compiler to recompile the application program to reduce the power consumption level of at least one instruction sequence identified as having an excess power consumption level.

22. The apparatus of claim 21, wherein the at least one functional unit further comprises:
a retirement unit to update a prosecution history buffer entry according to a value of a power consumption field of each executed micro-operation.

23. The apparatus of claim 21, wherein the at least one functional unit is to increment a power consumption field of each micro-operation by a power consumption level required to process the respective micro-operation.

24. The apparatus of claim 21, further comprising:
a power meter coupled to the at least one functional unit, the power meter to measure power consumed by the at least one functional unit during a program cycle.

25. The apparatus of claim 21, wherein the at least one functional unit further comprises:
an average power consumption meter, the at least one functional unit to update the average power consumption meter according to a power consumption per cycle value.

26. A system comprises:
a self-contained power source;
a processor coupled to the power source, the processor comprising:
at least one functional unit to execute micro-operations decoded from instructions of an application program, the functional unit to compute power consumption levels of instructions of an application program according to measured power consumption levels at the at least one functional unit during execution of the applications program; and
a memory coupled to the processor, the memory including a compiler to recompile the application program to reduce the power consumption level of at least one an instruction sequence identified as having an excess power consumption level.

27. The system of claim 26, wherein the at least one functional unit further comprises:
  a retirement unit to update a prosecution history buffer entry according to a value of a power consumption field of each executed micro-operation.

28. The system of claim 26, wherein the at least one functional unit is to increment a power consumption field of each micro-operation by a power consumption level required to process the respective micro-operation.

29. The system of claim 26, further comprising:
  a memory controller coupled between the processor and the memory; and
  an input/output controller coupled to the memory controller.

30. The system of claim 26, further comprising:
  logic built on a same die as the at least one functional unit and coupled to the at least one functional unit to measure power consumed by the at least one functional unit during a program cycle; and
  an integrated circuit package containing the die in which the logic, the at least one functional unit and the processor are built.

* * * * *

UNITED STATES PATENT AND TRADEMARK OFFICE
CERTIFICATE OF CORRECTION

PATENT NO. : 7,287,173 B2  Page 1 of 1
APPLICATION NO. : 10/741002
DATED : October 23, 2007
INVENTOR(S) : Hsieh It is certified that error appears in the above-identified patent and that said Letters Patent is hereby corrected as shown below:

In column 5, at line 4, delete "foe", and insert --for--.

Signed and Sealed this

Fifteenth Day of April, 2008

JON W. DUDAS
*Director of the United States Patent and Trademark Office*